June 6, 1967     B. B. PASQUINELLI     3,323,452
VARIABLE CUT-OFF WEB OFFSET PRESS
Filed Jan. 15, 1965     7 Sheets-Sheet 1
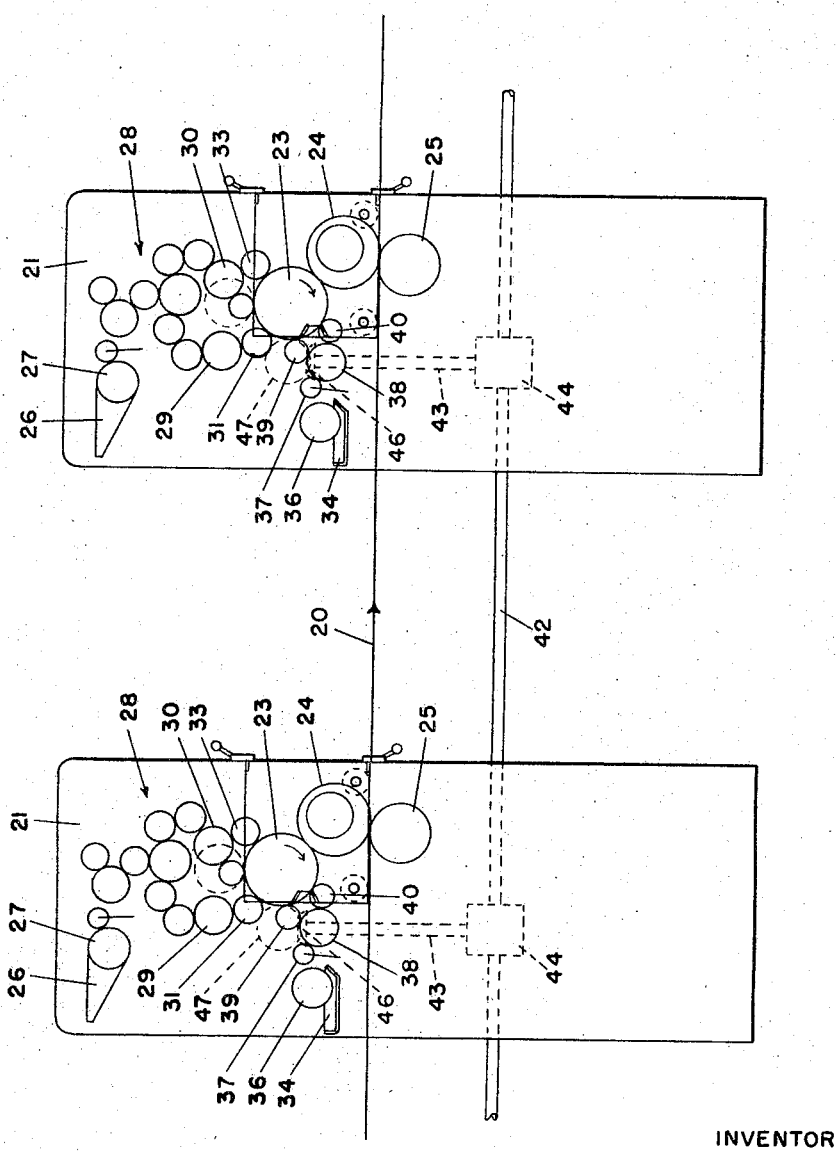
FIG. I
INVENTOR
BRUNO B. PASQUINELLI
BY
ATTORNEYS June 6, 1967  B. B. PASQUINELLI  3,323,452
VARIABLE CUT-OFF WEB OFFSET PRESS
Filed Jan. 15, 1965  7 Sheets-Sheet 2
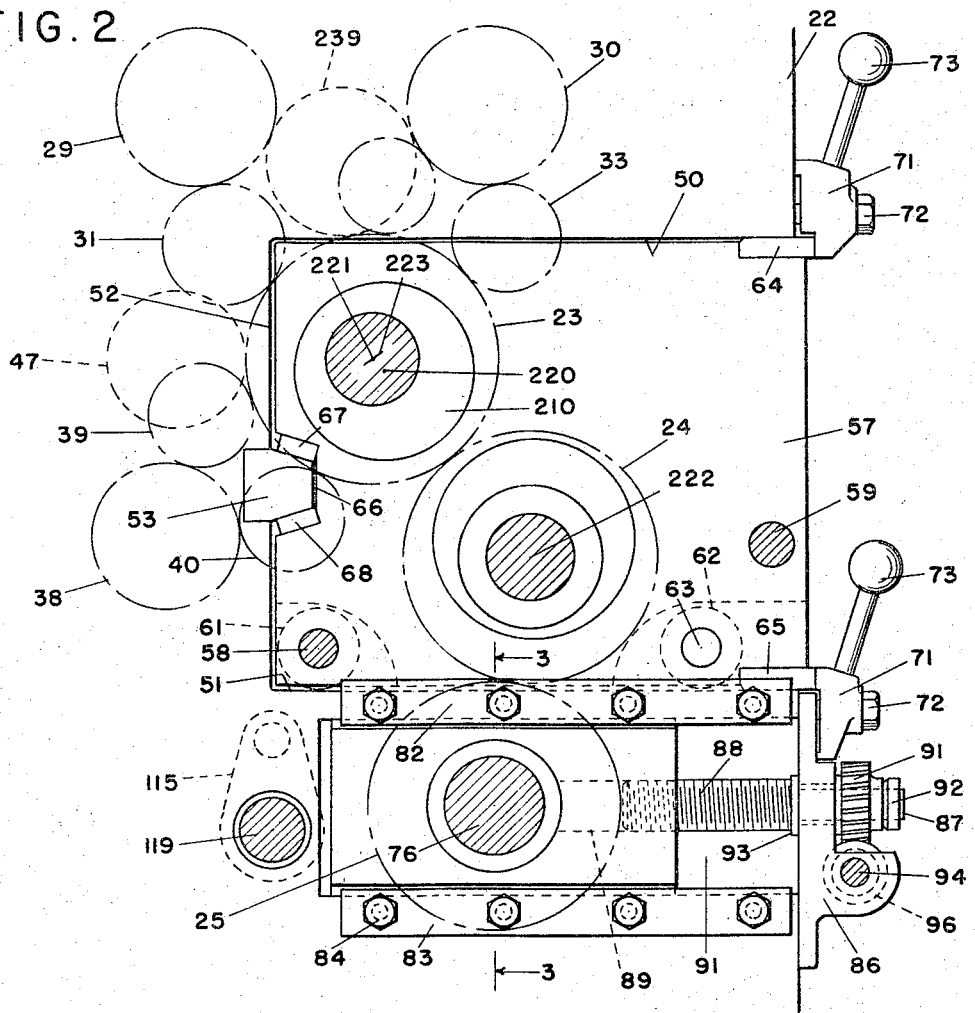
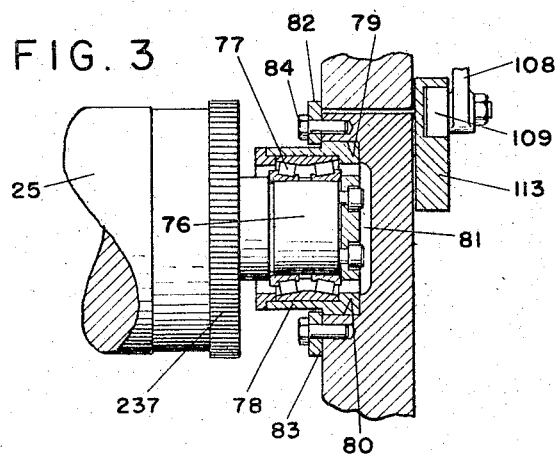
INVENTOR
BRUNO B. PASQUINELLI
BY
Hume Groen Clement & Hume
ATTORNEYS June 6, 1967  B. B. PASQUINELLI  3,323,452
VARIABLE CUT-OFF WEB OFFSET PRESS
Filed Jan. 15, 1965  7 Sheets-Sheet 4

INVENTOR
BRUNO B. PASQUINELLI
BY
*Hume Groen Clement & Hume*
ATTORNEYS

June 6, 1967 B. B. PASQUINELLI 3,323,452
VARIABLE CUT-OFF WEB OFFSET PRESS
Filed Jan. 15, 1965 7 Sheets-Sheet 5

INVENTOR
BRUNO B. PASQUINELLI
BY
Hume Groen Clement & Hume
ATTORNEYS

June 6, 1967  B. B. PASQUINELLI  3,323,452
VARIABLE CUT-OFF WEB OFFSET PRESS
Filed Jan. 15, 1965  7 Sheets-Sheet 6

INVENTOR
BRUNO B. PASQUINELLI
BY
Hume Groen Clement & Hume
ATTORNEYS

INVENTOR
BRUNO B. PASQUINELLI
BY
ATTORNEYS

United States Patent Office 3,323,452
Patented June 6, 1967

---

3,323,452
VARIABLE CUT-OFF WEB OFFSET PRESS
Bruno B. Pasquinelli, Evergreen Park, Ill., assignor to Miehle-Goss-Dexter, Incorporated, Chicago, Ill., a corporation of Delaware
Filed Jan. 15, 1965, Ser. No. 425,840
15 Claims. (Cl. 101—218)

This invention pertains to rotary web printing presses and it is directed more specifically to an improved, variable size, rotary web press which is capable of printing any size product within the maximum and minimum limits of the press.

Modern rotary web printing presses are capable of producing quality products at much higher speeds than sheet fed preses but they all have one inherent disadvantage which seriously curtails their use. Because of the relative inflexibility as to the size of the product a given web press can economically produce, the types and variety of jobs that can be printed on a web press are drastically limited. Unless the product is of such size that it will utilize substantially the entire capacity of the plate cylinder it is uneconomical to print it on a web press because the volume of paper wasted would be excessive.

Because of space limitations and the high cost of modern web presses, it is impossible for even the largest printing establishments to have a sufficient number of web presses of different sizes which would enable them to economically produce the myriad of product sizes required. Therefore, a substantial volume of work is still printed on the slower, more costly, sheet fed presses which are much more flexible as regards the size of the products they can accommodate.

The need for a practical, variable size, rotary web press has been recognized and attempts have been made in the past to solve this problem. None of the prior proposals have met with success, however, for several reasons. In some cases the devices were cumbersome, requiring expensive auxiliary mechanisms. Also, the devices did not increase the flexibility of the press to an extent sufficient to warrant the added cost. In other cases, due to the high hourly cost of the machines, the time required for changing cylinders and making all of the necessary connections and adjustments of the tripping, inking and other mechanisms more than offset the advantage afforded by the flexibility of the press.

It is an object of this invention, therefore, to provide a rotary web press which will be substantially infinitely variable as to the size of the product to be printed, within maximum and minimum limits, and which can be changed over in a minimum of time.

Another object is to provide a variable size rotary web press having interchangeable printing modules which can be made ready away from the press and quickly inserted and removed from the main frame.

A further object is to provide a variable size rotary web press incorporating interchangeable printing modules and wherein the main drive, the inking mechanism and the trippping mechanism of the press are automatically engaged and disengaged upon insertion and removal of the printing modules.

A still further object resides in the provision of means for accurately locating and rigidly locking the respective printing modules in their operative position within the main frame of the press.

Another object resides in the provision of a rotary web offset press having interchangeable printing modules each comprising a plate cylinder and a blanket cylinder and wherein the impression cylinder is mounted on the main frame of the press for convenient adjustment relative to the blanket cylinder of the module.

A further object resides in the provision of a module wherein the plate cylinder is mounted for skewing adjustment relative to a coacting cylinder and wherein said module incorporates means for automatically maintaining uniform contact between the plate cylinder and the form inking rollers for all skewed positions of the plate cylinder.

A still further object is to provide a variable size press wherein all of the elements of a press of a given size range are standard with the exception of the interchangeable modules. This permits mass production of substantially all of the basic elements of the press with the attendant savings in costs and a module of the appropriate size can be inserted when a customer's requirements are ascertained. Other objects and advantages will become evident from the following description and accompanying drawings wherein:

FIGURE 1 is a schematic side elevation of a two unit web offset printing press with which the invention is particularly associated;

FIGURE 2 is an enlarged view showing the manner in which each module is accurately located in position in the main frames and further showing the mechanism for adjusting the impression cylinder relative to the blanket cylinder;

FIGURE 3 is a sectional view taken along line 3—3 of FIGURE 2;

Figure 4:
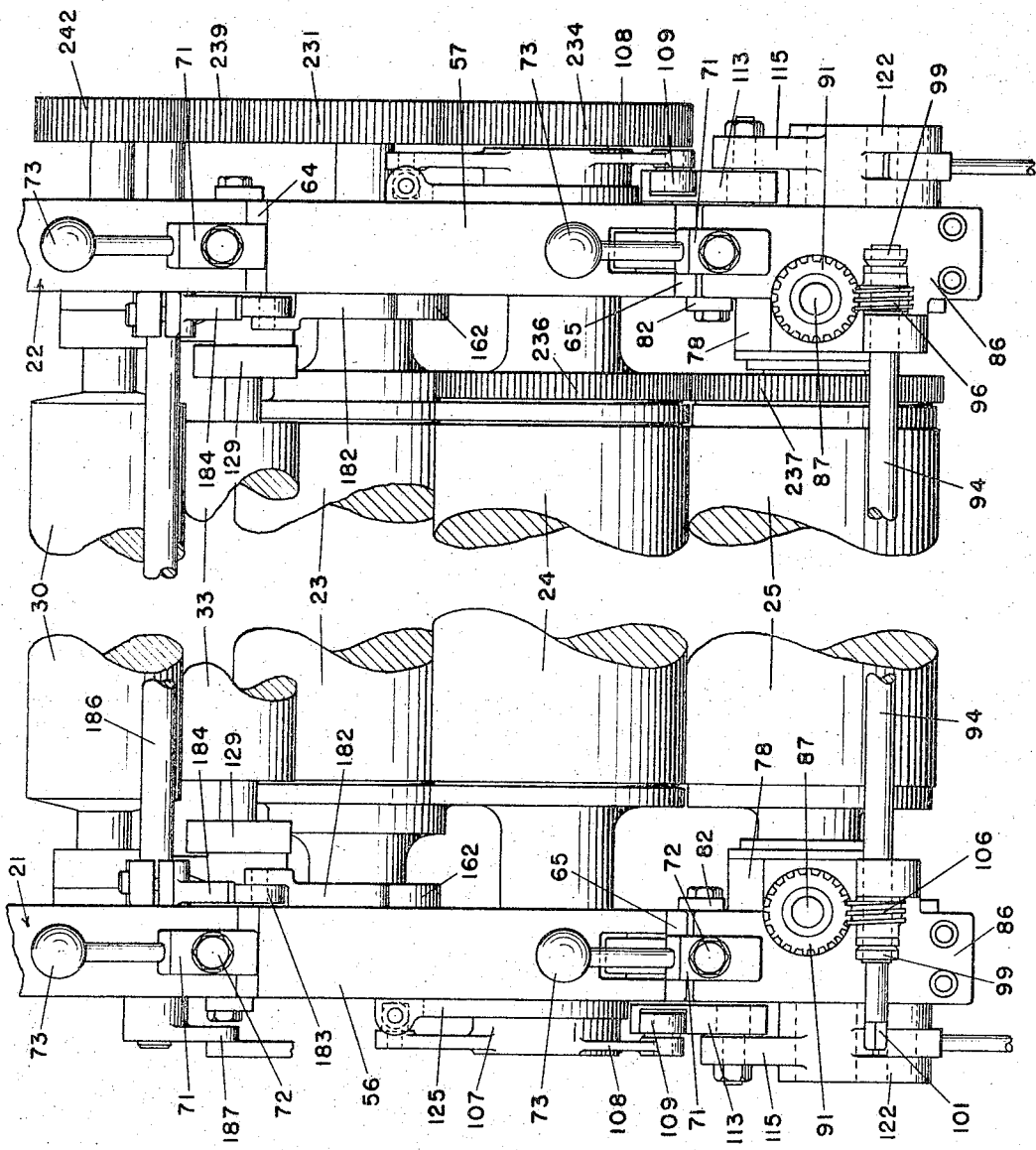
FIGURE 4 is a front elevational view of the printing press structure shown in FIGURE 2.

In the drawings and in the following description the invention is disclosed as incorporated in a web offset printing press for which type of press it is particularly advantageous. It will be readily apparent, however, that many of the features and principles thereof are applicable to and will be advantageous in other types of printing presses such as, for example, direct and indirect web letterpresses.

For the purpose of illustrating the invention FIGURE 1 discloses two printing units of a multi-color, unit type web offset press which may consist of any number of such units for printing sequential impressions upon a web 20.

The web is fed into the press from a roll stand, not shown, and after receiving an impression from the last unit it may be rewound or fed into a cutting and folding unit all as is well known in the art.

All of the printing units are substantially identical in their construction and mode of operation and a description of one unit applies equally well to the remaining units. Each unit consists of spaced apart main side frames 21 and 22, FIGURES 1 and 4, which provide support for all of the operating elements. The operating elements include the plate cylinder 23, the blanket cylinder 24, the impression cylinder 25 and the associated inking and dampening mechanisms for the plate cylinder. As shown in FIGURE 1, the inking mechanism includes a fountain or reservoir 26 in which a supply of ink is retained and this ink is transferred in the form of a thin film from the fountain roller 27 to the image areas of the plate on the plate cylinder 23 by a train of inking rollers 28 which includes the vibrator rollers 29 and 30 and the ink form rollers 31, 32 and 33.

The dampening mechanism consists of a fountain 34 for containing a supply of dampening solution, a fountain roller 36, a ductor roller 37 for transferring the solution from the fountain roller to a distributor roller 38 and from dampening rollers 39 and 40 which transfer the dampening solution from the distributor roller to the plate.

The printing units are arranged to be driven in unison from a main power shaft 42 which extends along the drive side of the units and which is adapted to transmit power to each unit drive shaft 43 through the respective gear boxes 44. The unit drive shaft is provided with a bevel gear 46 which meshes with a main drive gear 47 in each unit and the main drive gear is adapted to drive the various elements of the individual units as will be described more clearly hereinafter.

From the description thus far it will be apparent that when the press is in operation, the plate on the plate cylinder will receive water and ink from the dampening and inking rollers respectively as the plate cylinder rotates and the inked image on the plate will be subsequently transferred to the surface of a resilient blanket mounted on the periphery of the blanket cylinder. Upon continued rotation of the blanket cylinder the image will be transferred to the web as the latter passes through the nip between the blanket cylinder and the coacting impression cylinder. The image will be repeated each time the cylinders rotate and the respective images will be spaced apart lengthwise along the web a distance equivalent to the width of the gap in the plate and blanket cylinders and which must be provided to accommodate the plate and blanket clamping means respectively. Since the spaces between the images printed on the web constitute waste, the clamping means are designed so as to require a minimum of space and in most instances these gaps are about three-eighths inch in width.

It will also be obvious that for each cycle of operation the web will be advanced a distance equivalent to the circumference of the blanket cylinder and, therefore, in order to print economically it is required that the product size or image area of the plate be such as to fill the entire image area of the plate cylinder. If the product size is substantially less than maximum, large gaps will be formed between the successive images on the web resulting in excessive waste of the paper and which will more than offset the economies afforded by web printing.

To increase the versatility of web presses whereby flexibility as to the size of the products which can be printed on a web press is achieved, the present invention contemplates the provision of interchangeable, unitary modules, each having a plate and blanket cylinder which may differ in size with respect to the plate and blanket cylinders of the other modules and which are adapted to be quickly inserted into and removed from an operative position in the main frames. Each module contains only those elements which must be varied in size and they are so constructed and arranged that they can be interchanged with a minimum of adjustments and connections. By inserting the appropriate modules, the image size of a press can easily be varied between maximum and minimum limits. Such size changes will be limited to increments as determined by the pitch of the cylinder drive gear and will usually satisfy the average requirements. If more critical size changes should be desirable, however, this can be accomplished by changing the pitch of the cylinder drive gear to accommodate plate and blanket cylinders to meet the exact cut-off size desired.

With reference to FIGURES 1, 2 and 4, it will be seen that the main side frames 21 and 22 of each unit are each provided with a rectangular opening in one edge thereof to receive the interchangeable modules. Each opening has parallel top and bottom surfaces 50 and 51, respectively, which are connected by a vertical wall 52 and a wedge shaped projection 53 is provided in the vertical wall, the purpose of which is to locate the modules accurately and rigidly in position.

The modules are substantially self-contained units each of which consists of auxiliary frame members 56 and 57 which are spaced apart a distance equivalent to the main frames and the auxiliary frames are substantially the same thickness as the main frames. The auxiliary frames are connected together by means such as the tie bars 58 and 59 and wheels 61 and 62 are located in grooves which open into the bottom edge of the auxiliary frames to facilitate movement of the modules to and from an operative position in the main frames. As shown in the drawings, the wheel 61 is mounted for rotation about the axis of the tie bar 58 whereas the wheel 62 is mounted on a stud shaft 63 mounted in the auxiliary frame. The wheels project slightly beyond the bottom surface of the auxiliary frame so that they will support the modules and will roll over the surface 51 when the module is inserted and removed from the main frame.

The auxiliary frames are provided with pads 64 and 65 at the top and bottom rear corners thereof respectively which project beyond the top and bottom edges of the frames and the vertical front wall of each frame has a wedge shaped groove 66 formed therein which is provided with pads 67 and 68 on the respective inclined surfaces thereof. With this arrangement it will be seen that as a module is inserted into the openings in the main frame its weight is supported and it will roll on the wheels 61 and 62. However, before the module reaches the innermost operative position, the pad 67 of the groove 66 will contact the top inclined surface of the wedge block 53. At about the same position the lower pad 65 will contact the surface 51 of the main frame opening. Accordingly, upon final movement of the module to its operative position the pad 67 will slide up the inclined surface of the block 53 and the bevelled edge of the pad 65 will guide said pad onto the surface 51. Movement of the module will continue until the pads 67 and 68 are tightly wedged against the block 53 and the pads 64 and 65 are firmly seated on the surfaces 50 and 51.

It will be understood that when initially assembled the locating pads 67 and 68 will be shimmed so as to wedge tightly on the block 53 when the module is inserted precisely in the operative position and the pads 64 and 65 also will be positioned so as to substantially eliminate any clearance between said pads and the respective surfaces 50 and 51. Moreover, the slight raising of the module as the pads 67 and 65 engage their respective surfaces serves to lift the wheels 61 and 62 off the surface 51 so that the module is rigidly supported on the locating pads.

The modules are arranged to be locked securely in the operative position by means of latches 71, a latch being located above and below the opening in each main frame, respectively. The latches are pivotally mounted on bolts 72 secured in the main frame and they are provided with knobs 73 by means of which they can be moved between a horizontal position, wherein they clear the opening in the main frame for insertion and removal of a module, and a vertical position, as illustrated, wherein they engage the coacting faces of the respective pads 64 and 65. The coacting faces of the pads and latches are preferably bevelled so that upon movement of the latches to the locking position they will force the module tightly into its operative position.

With continuing reference to FIGURES 2 and 4 and also FIGURE 3, it will be noted that whereas the plate cylinder 23 and the blanket cylinder 24 are adapted to be removable with the interchangeable module, the impression cylinder 25 is mounted in the main frame members and it is adapted to coact with the different size blanket cylinders of the respective modules.

The impression cylinder in this instance has a continuous or unbroken periphery so that it can coact with the different size blanket cylinders and the shaft 76, see FIGURE 3, at each end thereof is journalled in a roller bearing 77 which in turn is secured in a bearing housing 78 that is arranged to be adjustable on the main frame so that the impression cylinder can be adjusted in accordance with the diameter of the respective blanket cylinders and to establish the desired impression pressure on the web as it passes between the impression cylinder and the blanket cylinder to receive an impression. The bearing housing is slidably mounted between guide surfaces 79 and 80 provided by a groove 81 in the main frame and it is retained therein by gibs 82 and 83 which extend parallel to the surfaces 79 and 80 and which are secured in position by means such as bolts 84.

A bracket 86 is mounted on the main frame over the end of the groove 81 and it provides support for a shaft 87 which is rotatably mounted in said bracket. One end of said shaft is threaded as at 88 and it extends into a tapped bore 89 in the bearing housing. The opposite end of the shaft beyond the bracket 86 is provided with a worm gear 91 which is secured in position by a locking member 92. A flange 93 formed on the shaft 87 coacts with the worm gear 91 to prevent axial movement of the shaft.

A control shaft 94, FIGURE 4, extends transversely across the width of the press, and it is journalled for rotation in the respective brackets 86. A worm 96 is secured to the control shaft adjacent each end thereof for meshing relation with the respective worm gears. Thrust members 99 secure the control shaft against axial movement and one end of said shaft is squared as at 101 to receive a tool whereby the shaft can be rotated.

Accordingly, when the control shaft 94 is rotated it will turn the shafts 87 in unison and in corresponding directions through the worms 96 and the worm gears 91. This in turn will cause the threaded end 88 of the shafts 87 to move into or out of the tapped hole 89 in the bearing housing but because the shafts 87 are retained against axial movement the bearing housings 78 and therewith the impression cylinder will be displaced horizontally along the guide surfaces 79 and 80, FIGURE 3.

By this means, the common impression cylinder can be adjusted for proper coaction with the different sizes of blanket cylinders in the respective modules and it also permits adjustment of the impression cylinder relative to the blanket cylinder to accommodate different web thicknesses.

Figure 5:
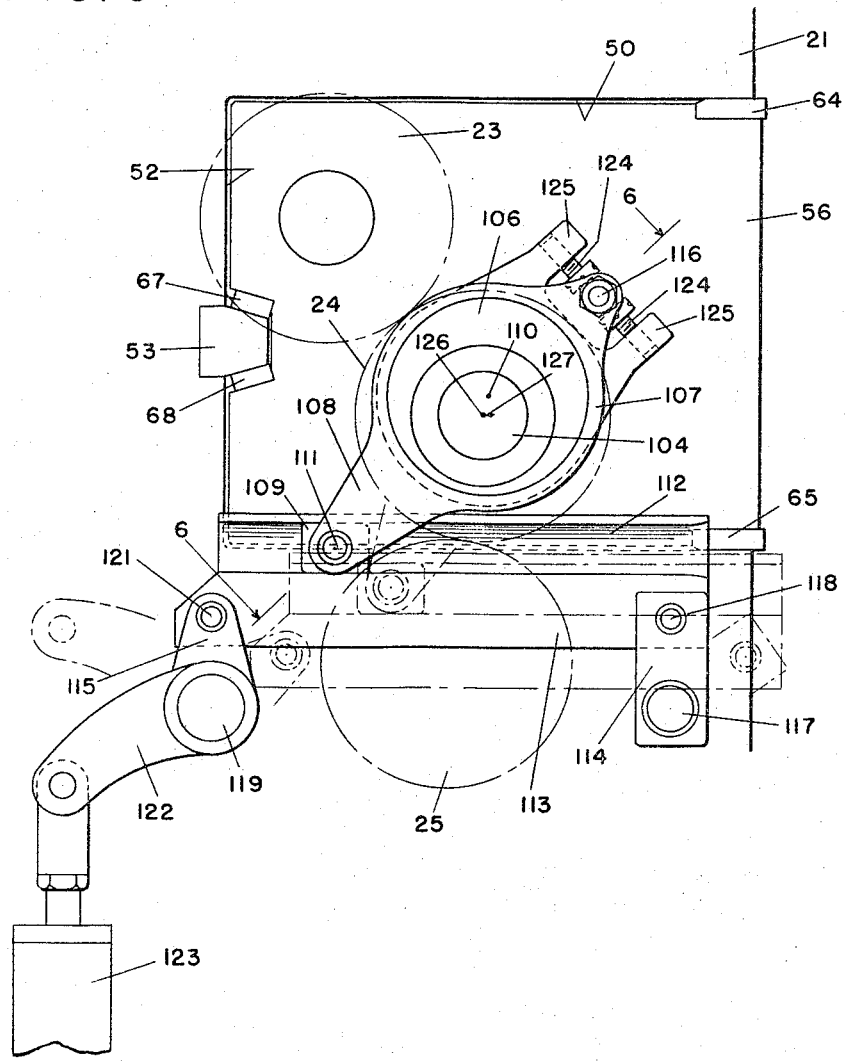
FIGURE 5 is a view depicting the mechanism for tripping the blanket cylinder from the plate and impression cylinder.
Figure 6:
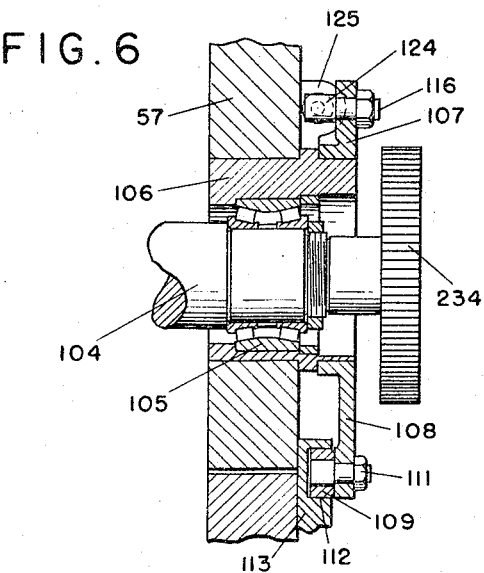
FIGURE 6 is a sectional view taken along line 6—6 of FIGURE 5.

The blanket cylinders of the respective modules, regardless of their different sizes, are adapted to be tripped relative to the plate and impression cylinders by a common actuating mechanism which is mounted on the main frames. The mechanism involved in tripping the blanket cylinder is shown in FIGURES 4, 5 and 6 wherein it will be seen that the shaft 104 at each end of the blanket cylinder is journalled in a roller bearing 105 which is seated in an eccentric bearing housing 106 that is rotatable in the auxiliary frame 57. A bracket 107 is mounted on the periphery of the bearing housing beyond the auxiliary frame and this bracket has an arm 108 extending radially therefrom which carries a block 109 that is pivotally mounted at the end of said arm on a stub shaft 111.

The block 109 is adapted to be slidably received within a channel 112 formed in the side face of a control bracket 113 which is supported in a horizontal position on the main frame member by means of the spaced arms 114 and 115. Arm 114 is freely rotatable on a stub shaft 117 projecting from the main frame and is pivotally connected to the control bracket by means of the pin 118. Arm 115 is fastened on the cross shaft 119 and also is pivotally connected to the opposite end of the control bracket by a pin 121. A second arm 122 is formed integral with the hub of arm 115 and it is pivotally connected to the piston of a pneumatic or hydraulic actuator 123 that is pivotally mounted on the main frame.

The actuator is arranged to be responsive to conventional web detecting means and is adapted, when energized, to rock the control bracket 113 from the "on" position shown by solid lines in FIGURE 5, to a "trip" position indicated by broken lines in the same figure. The movement of the control bracket is transmitted to the arm 108 through the block 109 to an extent indicated by the broken lines in FIGURE 5 and this in turn rotates the bracket 107 about the axis 110 of the eccentric bearing housing 106.

Movement of the bracket 107 is transmitted to the bearing housing by means of the stud 116 secured to the arm of the bracket 107 and which projects between the heads of the bolts 124 that are adjustable in the arms 125, respectively, formed on the housing 106. The bolts 124 are normally set tightly against the stud 116 and it will be evident that by appropriate adjustment of the bolts, the housing 106 can be rotated relative to the bracket 107. This provides an adjustment whereby the blanket cylinder can be brought into precise parallelism with respect to the plate cylinder and whereby the pressure between the plate and blanket cylinder can be readily adjusted.

When the eccentric 106 is rotated by the foregoing mechanism it will be seen that the axis 126 of the blanket cylinder will be moved in a path as indicated at 127 to thereby trip the blanket cylinder away from the plate and impression cylinders respectively. It also will be noted that the location and arrangement of the various elements is such that, upon insertion of a module into the main frame members the block 109 will automatically enter the channel 112 in the control bracket 113 and no further connections or adjustments are required to render the tripping mechanism operative.

Figure 7:
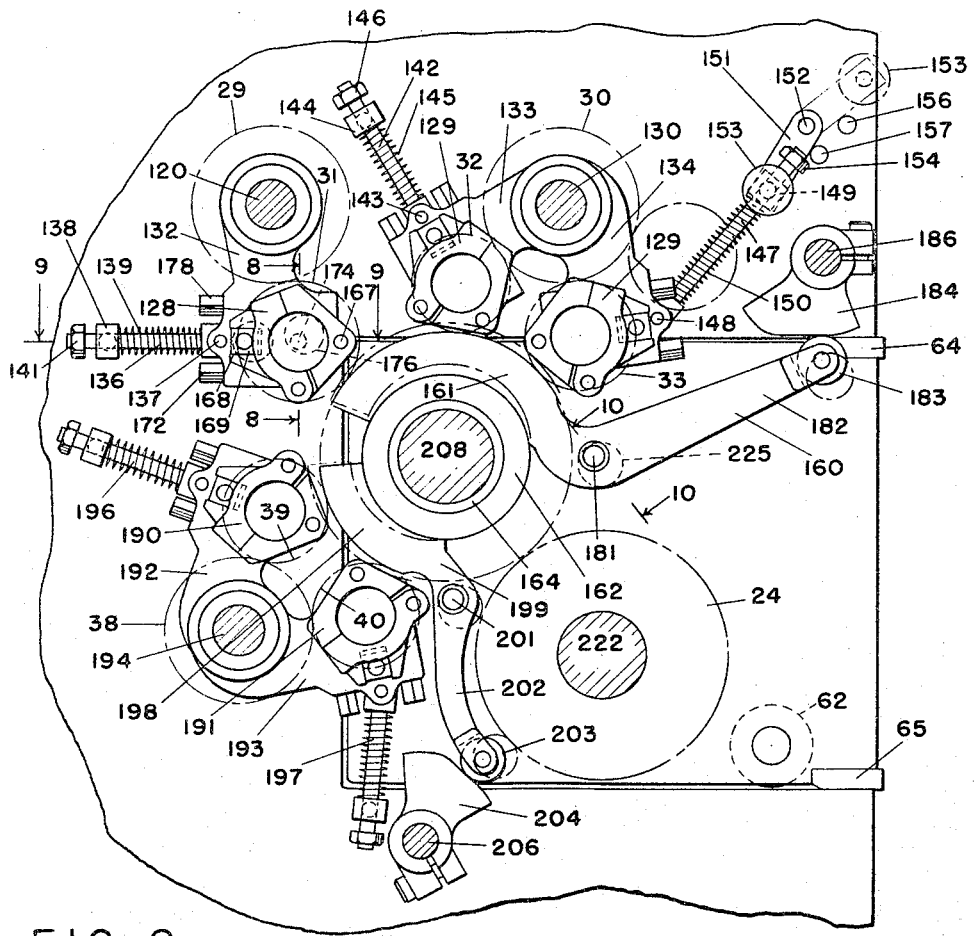
FIGURE 7 is a view showing the mounting means for the ink and water form rollers and the mechanism for tripping the form rollers off the plate cylinder.

The inking and dampening mechanisms also are arranged to readily accommodate changes in plate cylinder diameters so that corrective adjustments are not required each time the modules are changed. FIGURE 7 illustrates only those elements of the mechanisms which are directly affected and it will be seen that the shafts 120 and 130 for the vibrator rollers 29 and 30, respectively, are journalled for rotation in the main frames. The vibrator rollers are arranged to be gear driven as will be explained more fully hereinafter and they are also vibrated or oscillated axially in the conventional manner to thereby distribute a uniform film of ink to the ink form rollers 31, 32 and 33.

The ink form rollers are supported in the sockets such as 128 and 129 which are secured to the brackets 132, 133 and 134, the bracket 132 being pivotally mounted on the vibrator shaft 120 whereas brackets 133 and 134 are mounted for pivoting action about vibrator roller shaft 130.

A rod 136 is pivotally connected to bracket 132 as at 137 and its free end is slidably supported in a pivot block 138 mounted on the main frame. A spring 139 acting between the end of the rod and the block 138 tends to force the bracket 132 in a counter-clockwise direction, as viewed in FIGURE 7, to maintain the ink form roller 31 in contact with a plate cylinder and a stop nut 141 is provided to limit the extent of such motion when the plate cylinder is removed.

Bracket 133 has the rod 142 pivotally connected thereto at 143 and this rod is slidable in a pivot block 144 on the main frame. Spring 145 urges the bracket in a counter-clockwise direction about the shaft 130 and the stop nut 146 limits the motion when the plate cylinder is removed.

The bracket 134 is arranged to be urged in a clockwise direction about the axis of the shaft 130 to maintain the form roller 33 in contact with the plate cylinder and it has a rod 147 pivotally connected thereto as at 148. The free end of the rod is slidable in a pivot block 149 and the spring 150 acts against said block to urge the bracket 134 in a clockwise direction. Pivot block 149 is secured to the end of a toggle link 151 which is pivotally mounted at 152 on the main frame and it carries a knob 153 by means of which the toggle link may be moved from the operative position as indicated in solid lines in FIGURE 7 to the broken line position. This is necessary in order to retract the form roller 33 to the broken line position indicated in FIGURE 7 to provide clearance for the plate cylinder when the latter is inserted and removed. When the toggle link is moved from the solid line position to the broken line position, the block 149 will engage the stop nut 154 and raise the form roller to its retracted position. The pins 156 and 157 projecting from the main frame serve to maintain the toggle link 151 in either of its two positions.

Figure 8:
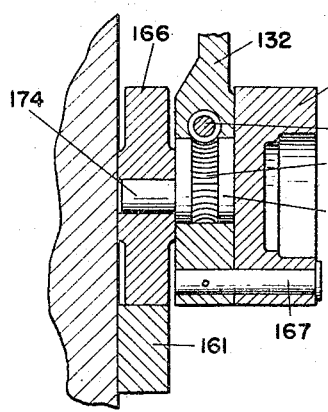
FIGURE 8 is a sectional view taken along line 8—8 of FIGURE 7.
Figure 12:
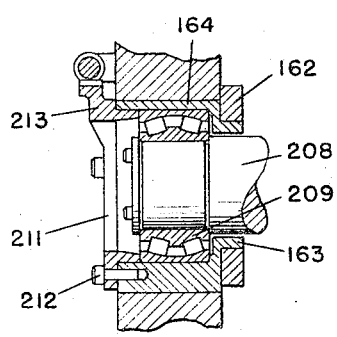
FIGURE 12 is a detailed sectional view showing the journalling means for the plate cylinder.

The contact relation between the respective ink form rollers and the plate cylinder is controlled by the trip lever 160 which has an arcuate arm 161 which is adapted to rest on a collar or control disc 162 that is concentric with the plate cylinder and is supported on the flange 163, FIGURE 12, provided by the plate cylinder bearing housing 164. The radius of the arm 161 is precisely the same as the pitch line of the plate cylinder drive gear and thus the peripheral surface of the arm 161 of each module will serve to locate the form inking rollers in proper relation to the different size plate cylinders. The arm 161 is adapted to engage a control roller 166 as shown in FIGURE 8. A control roller is associated with each of the brackets 132, 133 and 134.

Each of the form inking rollers is arranged to be adjustable relative to its associated vibrator roller and the plate cylinder to establish the desired contact relation therewith. The adjusting means are identical for each form roller and, therefore, the adjusting means for roller 31 will be described in detail.

Figure 9:
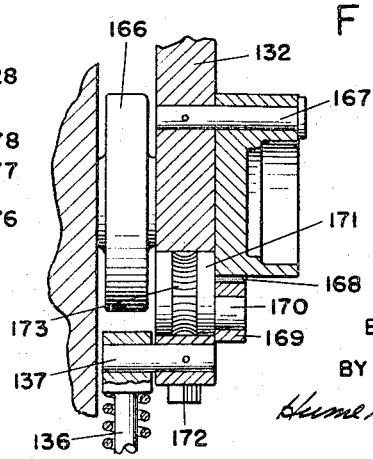
FIGURE 9 is a sectional view taken along line 9—9 of FIGURE 7.

With reference to FIGURES 8 and 9 it will be seen that the form roller socket 128 is pivotally mounted on the bracket 132 by means of the pin 167. The opposite end of the socket has a slot 168 formed therein and which slidably receives the block 169 that is pivotally mounted on the boss 170 projecting laterally from the cylinder 171 which is rotatable in the bracket 132. The boss 170 is formed eccentric to the cylinder 171 and therefore when the cylinder is rotated the block 169 will pivot the socket 128 about the pin 167 to thereby adjust the form roller relative to the vibrator roller 29. Such adjustments are effected by turning the shaft 172 FIGURE 7, which is journalled in the bracket and has a worm formed thereon which meshes with the worm teeth 173 formed in the periphery of the cylinder 171.

Contact between the form roller and the plate cylinder is controlled by the roller 166 which engages the arm 161 of the trip lever. This roller is rotatable about the stub shaft 174 formed eccentric on the cylinder 176 which is rotatable in the bracket 132. The cylinder has worm teeth 177 formed in its periphery which mesh with a worm on the shaft 178 which is journalled for rotation in the bracket.

Accordingly when the form roller 31 is initially adjusted, the shaft 172 is turned to pivot the socket about the pin 167 and thereby establish the desired contact relation between the form roller and the vibrator roller. Thereupon, the shaft 178 is adjusted so as to move the roller 166 relative to the bracket in order to establish the desired contact relation between the form roller and the plate cylinder. Once this setting is established it normally will not have to be changed upon the insertion of different modules because the respective arms 161 on each module will engage the various rollers 166 on the brackets 132, 133, 134, and automatically locate the form rollers at the proper center distance with respect to the plate cylinders.

The trip lever 160 is pivotally mounted at 181 on the auxiliary frame and it has an arm 182 formed integral therewith. This arm carries a roller 183 at the free end thereof and which is located immediately below a trip cam 184 when the module is in its operative position. The cam 184 is secured to a shaft 186 rotatably mounted in the main frames and this shaft is arranged to be oscillated through a lever 187, see FIGURE 4, secured to one end thereof.

It will be understood that means are provided to actuate the shaft 186 when the press is tripped and as the cam 184 moves in a counter-clockwise direction, as viewed in FIGURE 7, it will depress arm 182 of the trip lever 160. This will pivot the lever about its axis 181 thereby raising the arcuate arm 161 to the position indicated by the broken lines which will lift the ink form rollers off the plate cylinder.

The form dampening rollers are mounted in a manner substantially identical to the form inking rollers and they are supported in sockets 190 and 191 carried by brackets 192 and 193, respectively, which are pivotally mounted on the vibrator roller shaft 194. Spring and rod means 196 and 197 urge the respective dampening rollers 39 and 40 toward the plate cylinder and their contact relation is controlled by the rollers 166 which ride on the periphery of the arm 198 of the trip lever 199. The arm 198 is concentric with the plate cylinder and it has a radius such that when it rests on the control disc 162 its periphery is precisely coincident with the pitch line of the plate cylinder drive gear. The sockets 190 and 191 are adjustable in the same manner as the ink roller sockets for the purpose of establishing the desired contact relation between the form dampening rollers and the vibrator roller 38 as well as the plate cylinder.

Lever 199 is pivotally mounted on the auxiliary frame as at 201 and it has a second arm 202 which carries a roller 203. In the operative position of the module the roller 203 is located adjacent the cam 204 secured to the cross shaft 206 and this shaft is arranged to be oscillated by suitable tripping mechanism, not shown, to thereby trip the form dampening rollers off the plate cylinder in the same manner as the form inking rollers.

Figure 13:
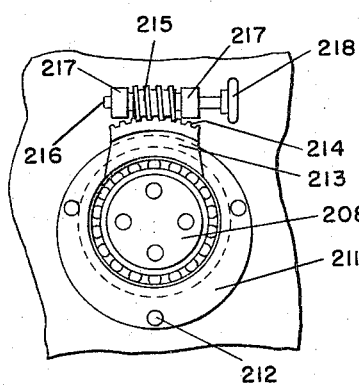
FIGURE 13 is a front elevational view of FIGURE 12 illustrating the mechanism for adjsuting the plate cylinder.

The plate cylinder 23 is arranged to be skewed relative to the blanket cylinder 24 in order to compensate for a misaligned plate and for this reason one or both ends of the plate cylinder are journalled in adjustable eccentric bearing housings. As shown in FIGURES 12 and 13 the plate cylinder shaft 208 is journalled in a self-aligning roller bearing 209 which in turn is seated in an eccentric housing 164. The bearing housing has a cap 211 secured thereto by bolts 212 and this cap has a radial arm 213 formed integral therewith. The arm 213 is provided with gear teeth 214 which mesh with a worm 215 secured to a shaft 216 which is journalled for rotation in bosses 217 on the auxiliary frame. A handle 218 is fixed to one end of the shaft 216 and by turning this handle the eccentric bearing housing can be rotated to thereby shift one end of the plate cylinder relative to the blanket cylinder.

With reference to FIGURE 2, it will be seen that in the normal position of the plate cylinder, wherein it is precisely parallel to the blanket cylinder, the axis 220 of the eccentric bearing housing is coincident with a plane extending through the axis 221 of the plate cylinder and the axis 222 of the blanket cylinder. Consequently, when the bearing housing 164 is adjusted the end of the plate cylinder will be skewed in a direction substantially normal to the above mentioned plane as indicated by the line 223. Such adjustments are generally limited to about .020" to either side of center.

With reference once again to FIGURE 7 it will be noted that when the plate cylinder 23 is skewed it will cause the control disc 162 to move bodily relative to the trip levers 160 and 199, respectively. Accordingly, the trip levers are mounted so they can shift automatically with the plate cylinder and since the mounting arrangement is the same for both levers a description of lever 160 will apply as well to lever 199.

Figure 10:
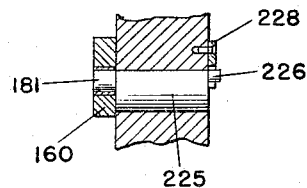
FIGURE 10 is a section taken along line 10—10 of FIGURE 7.
Figure 11:
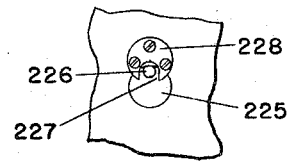
FIGURE 11 is a front elevation of FIGURE 10.

With reference to FIGURES 10 and 11 it will be seen that the pivot pin 181 is formed eccentrically on a cylindrical body 225 which is rotatable in the auxiliary frame. At its opposite end the body 225 has an eccentric pin 226 projecting therefrom and this latter pin is adapted to fit loosely in a slot 227 formed in a washer 228 which is fixed to the auxiliary frame in a manner that it overlaps the body 225.

It also will be noted that, in the neutral position as shown in FIGURE 7, the axes of the pin 181 and the cylindrical body 225 are aligned in a plane which is substantially parallel to a plane through the axes of the plate and blanket cylinders.

Thus it will be seen that when the plate cylinder is skewed relative to the blanket cylinder, the trip arm 160 will move bodily therewith since the pivot axis 181 will shift about the axis of the cylindrical body 225 to maintain the arm 161 in contact with the control disc 162 and the form inking rollers will remain at the proper center distance with respect to the plate cylinder.

The clearance between the washer slot 227 and the pin 226 is sufficient to permit shifting of the cylindrical body 225 to an extent necessary for maximum skewing adjustments of the plate cylinder, but the washer 228 prevents the cylindrical body from rotating beyond the limited extent when the trip arm 160 is actuated by the cam 184 to trip the form inking rollers off the plate cylinder.

Figure 14:
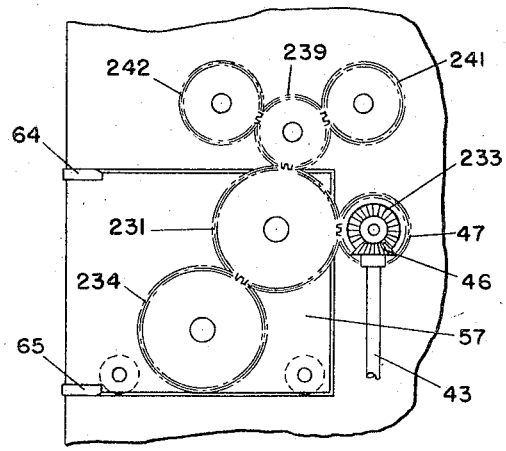
FIGURE 14 is a view illustrating how the respective drive gears are meshed upon insertion of the printing module to its operative position.

The plate cylinders of the respective modules are provided with a drive gear 231, FIGURE 14, at the drive end thereof which is adapted to mesh with a main drive gear 232 mounted on the main frame and which is driven from the drive shaft 43 through the bevel gears 46 and 233. The blanket cylinder has a gear 234 on the shaft thereof and whereby it is driven from the plate cylinder. The blanket cylinder also has a gear 236 thereon, see FIGURE 4, which is located within the auxiliary frame 57 and which is adapted to drive the impression cylinder through a gear 237. The plate cylinder, regardless of its diameter, is so located in the auxiliary frames that when a module is inserted into the main frames it will automatically mesh with the main drive gear 232. All that is necessary is that the main drive gear be in a position that the proper tooth of the plate cylinder will engage therewith so that all of the modules will be timed properly with the drive.

The plate cylinder gear 231 is also adapted to drive the inking mechanism through the gear 239 which meshes with and drives the gears 241 and 242 on the shafts of the vibrator rollers 29 and 30, respectively. It will be understood that other gears mesh with the vibrator roller gears to drive the remainder of the inking mechanism.

With this arrangement it will be seen that all of the associated elements are driven from the plate cylinder drive gear and thus they will be driven at the proper speed regardless of the diameter of the plate cylinder.

Figure 15:
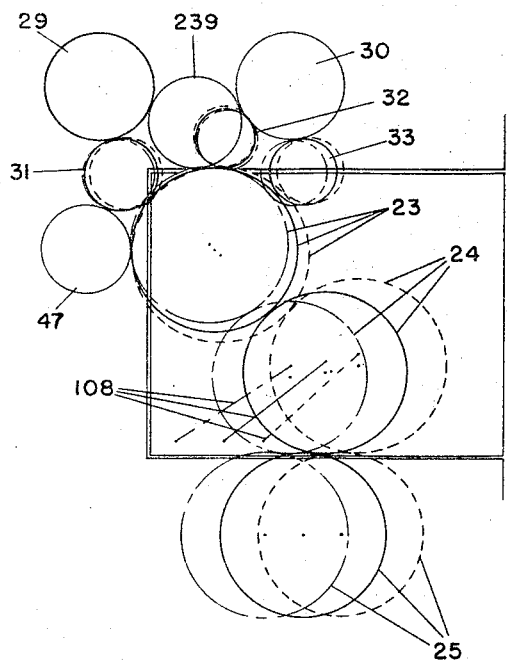
FIGURE 15 is a schematic view illustrating the location and arrangement of various members when printing modules having different size cylinders are inserted in the main frames.

With reference now to FIGURE 15 it will be seen how the various elements will be located when modules having different sized plate and blanket cylinders are inserted into the main frames.

The solid lines in this figure indicate the positions of the various members when an intermediate size plate and blanket cylinder is employed. The dot-dash lines illustrate the minimum size plate and blanket cylinders and the dotted lines depict the locations for the maximum size cylinders.

The axes of the different size plate cylinders are located in the respective auxiliary frames so that the plate cylinder gear of each module will mesh properly with the main drive gear and with the inking mechanism drive gear and the blanket cylinder axes are so located that said cylinders will be wholly within the perimeter of the auxiliary frames. Accordingly, the impression cylinder is adjustable horizontally so that it can be brought into proper position with the respective blanket cylinders.

The form inking and dampening rollers will automatically adjust to the diameter of the different plate cylinders since they are located by means of the rollers 166 which engage the respective trip arms 161 and 198. It also will be noted that the blanket cylinder trip arm 108 will be so oriented on the respective modules that the block 109 will be aligned with the channel 112 of the control bracket 113.

Figure 16:
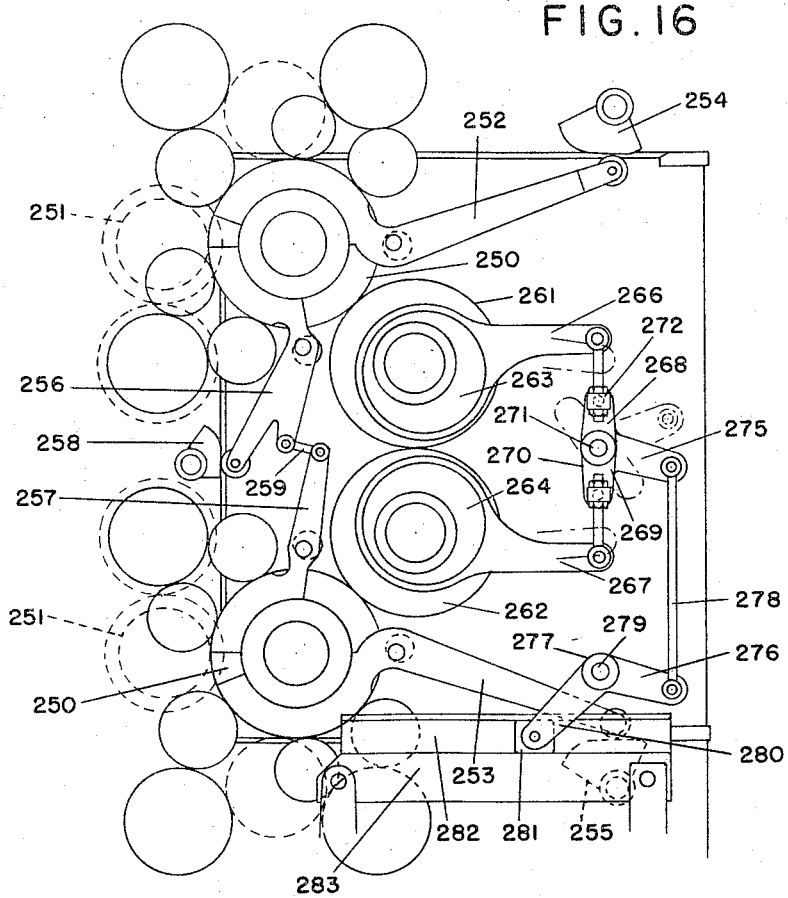
FIGURE 16 illustrates an interchangeable module having four cylnders for a blanket to blanket web offset perfecting press.

The description thus far has been directed to a web offset press for printing on one side only of the web in which case the modules contain only one plate cylinder and one blanket cylinder. The principle, however, is applicable to perfecting presses also in which case each module would contain two plate and blanket cylinders as indicated schematically in FIGURE 16.

The drive would be substantially the same as in the standard offset press except that each plate cylinder 250 would be driven by a drive gear 251 on the main drive shaft and the ink form rollers would be tripped by separate trip arms 252 and 253 which would be actuated by the respective cams 254 and 255.

The dampening rollers would also have trip arms 256 and 257, respectively, which could be activated by separate cam means. However, for purposes of economy they could be actuated by a common cam such as 258 which would actuate the lever 256 and this motion would be transmitted to lever 257 through a connecting link 259.

The respective blanket cylinders 261 and 262 would be mounted in eccentric bearing housings 263 and 264 which are arranged to be rotated by a common actuator to thereby trip said cylinders away from each other and from their respective plate cylinders. For this purpose the arms 266 and 267 of the eccentric actuating brackets are shown as connected to the arms 268 and 269, respectively, of a three armed lever 270 which is pivotally mounted on a stub shaft 271 in the auxiliary frame. The connections are preferably made by turnbuckle means 272 so that the respective eccentrics can be adjusted to establish the desired pressure relation between the two blanket cylinders. It will be understood that suitable means such as that shown in FIGURE 5 is provided to permit adjustment of the eccentrics 263 and 264 relative to their respective control brackets so that the blanket cylinders can be adjusted pressurewise with respect to the plate cylinders.

The third arm 275 of lever 270 is connected to the arm 276 of bell crank 277 by the rod 278. The bell crank 277 is pivoted at 279 on the auxiliary frame and the arm 280 of the bell crank carries a block 281 which is slidably received in the channel 282 of the control bracket 283. The control bracket is arranged to be actuated in the same manner as that shown in FIGURE 5 and when it is retracted it will pivot lever 270 to the position indicated by broken lines in FIGURE 16. This will rotate the respective eccentrics 263 and 264 to trip the blanket cylinders away from each other and from the respective plate cylinders.

What is claimed is:

1. A variable size rotary web printing press comprising a pair of spaced main frame members, an opening provided in the corresponding side of each main frame member, interchangeable modules adapted to be inserted into and removed from an operative position in the openings in the main frame members, said modules each including auxiliary frame members spaced apart a distance corresponding to the main frame members, a plate cylinder and a coacting cylinder journalled for rotation in the auxiliary frame members, and means for accurately locating the respective modules in the openings in the main frames including a pad fixed to the top and bottom surfaces of each auxiliary frame member at the rear edge thereof, a V-groove provided in the front edge of each auxiliary frame member, a correspondingly V-shaped element projecting inwardly from the vertical side of each opening in the main frame, and latch means on the main frame for holding said auxiliary frames in the said openings in the main frames in a manner that said V-shaped elements are received in the V grooves provided therefor and said pads are in contact with the top and bottom edges of said openings, said pads, elements and V grooves serving to locate and accurately support the auxiliary frames in the main frames.

2. A variable size rotary web printing press comprising a main frame, a printing module adapted to be removably mounted in an operative position in the main frame, said printing module including auxiliary frame members, a plate cylinder journalled for rotation in the auxiliary frame members, a coacting cylinder journalled for rotation in the auxiliary frame members, means for tripping the coacting cylinder from a first position wherein it is in contact with the plate cylinder to a second position wherein it is spaced from the plate cylinder including an actuatable lever mounted on the printing module, a trip member mounted on the main frame and having means for automatically engaging said lever upon movement of the printing module to its operative position in the main frame, and means for moving said trip member to thereby actuate the lever and move the coacting cylinder from the said first position to the said second position.

3. A variable size rotary web printing press comprising a pair of spaced main frames, an opening provided in the corresponding side of each main frame, a printing module adapted to be removably mounted in the openings of said main frames, said module including auxiliary frame members, a plate cylinder journalled for rotation in the auxiliary frame members, a second cylinder journalled for rotation in the auxiliary frame members for coaction with the plate cylinder, the journalling means for said second cylinder including adjustable eccentric bearing housings, a lever secured to each bearing housing for imparting limited rotary motion to said housings to thereby trip the second cylinder away from the plate cylinder, a control member movably mounted on each side frame and adapted to be interlocked with said levers respectively, upon insertion of the module into the openings in said main frames, and means for actuating said control members to thereby move said levers.

4. A variable size rotary web printing press comprising a pair of spaced main frames, interchangeable printing modules adapted to be readily inserted into and removed from an operative position on the main frames, each module including auxiliary frame members, a plate cylinder journalled for rotation in the auxiliary frame members, a second cylinder journalled for rotation in the auxiliary frame members for coaction with the plate cylinder, the journalling means for said second cylinder including adjustable eccentric bearing housings, a lever having a connected relation with each bearing housing for imparting limited rotary motion to the bearing housings to thereby trip said second cylinder to and from an operative position with respect to the plate cylinder, a control member movably mounted on each main frame and having a horizontal groove formed therein, a control element secured to each of said levers and adapted to enter the said grooves respectively, upon insertion of a module into its operative position in the main frames, and means for retracting the control members to impart limited rotary motion to said levers and thereby to said eccentric housings.

5. Apparatus as set forth in preceding claim 4 wherein means are provided for adjusting each bearing housing relative to its lever to adjust the contact relation between the second cylinder and the plate cylinder when the said cylinders are located in their operative positions.

6. A variable size rotary web printing press comprising a pair of spaced main frames, each of said main frames having an opening therein in transverse alignment, a printing module adapted to be removably mounted in the openings in said main frames, said module including auxiliary frame members in spaced relation, a plate cylinder journalled for rotation in the auxiliary frame members, a blanket cylinder journalled for rotation in the auxiliary frame members and adapted to coact with the said plate cylinder, the journalling means for the blanket cylinder including adjustable eccentric bearing housings, lever means having a connected relation with each bearing housing for imparting simultaneous rotary motion to the bearing housings to thereby trip said blanket cylinder to and from an operative position with respect to the plate cylinder, a control member movably mounted on each main frame and having operative connection with its respective lever means, and interconnecting adjustable means between each bearing housing and its lever means for adjusting the bearing housings relative to the lever means whereby to vary the contact relation between the blanket cylinder and the plate cylinder of said module.

7. A variable size rotary web printing press comprising a pair of spaced main frames, the corresponding side of each main frame having an opening formed therein, a printing module adapted to be removably mounted in the openings of said main frames, said module including auxiliary frame members and a plate cylinder journalled for rotation in said auxiliary frame members, inking mechanism for said plate cylinder including at least one form inking roller, means pivotally mounting said form inking roller on the main frames for movement between an inking position and a tripped position, resilient means for urging said form roller toward said inking position, a guide roller mounted at each end of the form inking roller, and a control surface mounted concentric with the plate cylinder journals at each end thereof, said control surfaces being adapted to engage the guide rollers on the form inking roller to thereby locate the form inking roller in an operative inking position with respect to the plate cylinder upon insertion of the module into the openings in the main frames.

8. A variable size rotary web printing press comprising a pair of spaced main frames, interchangeable printing modules adapted to be removably mounted in an operative position in said main frames, each module including auxiliary side frames and a plate cylinder journalled for rotation in said auxiliary side frames, the plate cylinder of each module differing in diameter from the plate cylinders of the other modules, inking mechanism for said plate cylinders including form inking rollers pivotally supported on the main frame members, resilient means for urging the respective form inking rollers toward said plate cylinders when the latter are in an operative position, a control member at each end and arranged concentric with the axis of the plate cylinder and having operation to maintain the form rollers at a predetermined radial position with respect to the plate cylinder, means pivotally supporting each control member on the auxiliary frames, a lever associated with each control member, and tripping means on the main frame for actuating said levers and therewith pivoting the control members about their pivot axes to thereby raise the form rollers off the plate cylinder, the said levers of each module assuming an operative position with respect to the tripping means upon movement of the respective modules to an operative position in said main frames.

9. A rotary web printing press comprising a pair of spaced main frames, the corresponding side of each main frame having an opening formed therein, a printing module adapted to be removably mounted in the openings of said main frame, said module including auxiliary frame members and a plate cylinder journalled for rotation by said auxiliary frame members, inking mechanism for said plate cylinder including at least one form inking roller and one form dampening roller, bracket means pivotally mounting said form inking roller on the main frames for movement between an inking position and a trip position, additional bracket means pivotally mounting said form dampening roller on the main frames for movement between an operative position and a tripped position, resilient means for individually urging said form inking roller and said form dampening roller toward its inking position and toward its operative position, respectively, a guide roller mounted at each end of the form inking roller, other guide rollers mounted at each end of the form dampening roller, a first control member mounted concentric with the plate cylinder journals at each end thereof, said first control member being adapted to engage the guide rollers on the form inking roller to thereby locate the form inking roller in an operative inking position with respect to the plate cylinder upon insertion of the module into the openings in the main frames, and a second control member mounted concentric with the plate cylinder journals at each end thereof, said second control member being adapted to engage the guide rollers on the form dampening roller to thereby locate the form dampening rollers in an operative position with respect to the plate cylinder upon insertion of the module into the openings in the main frames.

10. A rotary web printing press comprising a pair of spaced main frames, a printing module adapted to be inserted into and removed from a printing position in said main frames, said module including auxiliary side frames, a plate cylinder journalled for rotation by the auxiliary side frames, a blanket cylinder also journalled for rotation by said auxiliary side frames and normally positioned in parallel relation to said plate cylinder, an eccentric bearing housing for journalling one end of said plate cylinder, means for adjusting the bearing housing to thereby skew said one end of the plate cylinder relative to the blanket cylinder in a direction substantially perpendicular to a plane intersecting the axes of said cylinders, a plurality of form inking rollers pivotally mounted on the main frame members, resilient means for urging said form inking rollers towards the plate cylinder, a guide roller mounted at each end of each form inking roller, a control member at each end and arranged concentric with the plate cylinder, said control members having contact with the guide rollers for maintaining the form inking rollers at a predetermined radial center distance with respect to the plate cylinder, and pivot means pivotally supporting each control member on its auxiliary frame member for oscillating movement substantially radially with respect to the plate cylinder to thereby raise the form inking rollers off the plate cylinder when said control members are oscillated in the proper direction.

11. A rotary web printing press as defined by claim 10, additionally including a plurality of form dampening rollers pivotally mounted on the main frame members, additional resilient means for urging said form dampening rollers toward the pltae cylinder, a guide roller mounted at each end of each of the form dampening rollers, a second control member at each end and arranged concentric with the plate cylinder, said second control members having contact with the guide rollers on the form dampening rollers for maintaining the form dampening rollers at a predetermined radial distance with respect to the plate cylinder, and pivot means pivotally supporting each second control member on its auxiliary frame member for oscillating movement substantially radially with respect to the plate cylinder to thereby raise the form dampening rollers off the plate cylinder when said control members are oscillated in the proper direction.

12. A rotary web printing press comprising a pair of spaced main frames, a printing module adapted to be inserted into and removed from a printing position in said main frames, said module including auxiliary side frames, a plate cylinder journalled for rotation in the auxiliary frames, a coacting cylinder journalled for rotation in said auixiliary frames in normally parallel relation to said plate cylinder, an eccentric bearing housing for journalling one end of said plate cylinder, means for adjusting the bearing housing to thereby skew said one end of the plate cylinder relative to the coacting cylinder in a direction substantially perpendicular to a plane intersecting the axes of said cylinders, a plurality of form rollers pivotally mounted on the main frame members, resilient means for urging said form rollers toward the plate cylinder, a control member at each end and arranged concentric with the plate cylinder for maintaining the form rollers at a predetermined radial center distance with respect to the plate cylinder, and pivot means pivotally supporting each control member on its auxiliary frame member for oscillating movement substantially radially with respect to the plate cylinder to thereby raise the form rollers off the plate cylinder, said pivot means being mounted for limited bodily movement in the auxiliary frames respectively, whereby the pivot axis of the control members will shift when said one end of the plate cylinder is skewed to thereby maintain the control member concentric with the plate cylinder.

13. In a printing press having spaced main frames and a plate cylinder journalled for rotation by said main frames, at least one form roller adapted to have coacting relation with the plate cylinder, a pair of brackets pivotally supported with respect to said main frames, respectively, a journalling socket provided by each bracket and said sockets forming means for journalling the said form roller, interconnecting means between each main frame and the bracket pivotally associated therewith for resiliently biasing the brackets and thus the form roller towards the plate cylinder, and an eccentric member carried by each bracket and having operative connection with the socket thereof for adjusting the position of the socket with respect to the bracket.

14. A printing press having spaced main frames and a plate cylinder as defined by claim 13, additionally including a second eccentric carried by each bracket, a stub shaft provided by each of the second eccentrics and extending laterally from the bracket on one side thereof, a guide roller mounted on each stub shaft for rotation, and means for adjusting said second eccentrics respectively to thereby shift the guide roller relative to the bracket.

15. A variable size rotary web printing press comprising a pair of spaced main frame members, an opening provided in the corresponding side of each main frame member, interchangeable modules adapted to be inserted into and removed from an operative position in the openings in the main frame members, said modules each including auxiliary frame members spaced apart a distance corresponding to the main frame members, a plate cylinder and a coacting cylinder journalled for rotation in the auxiliary frame members, and means for accurately locating the respective modules in the openings in the main frames including a pad fixed to the top and bottom surfaces of each auxiliary frame member at the rear edge thereof, a V-groove provided in the front edge of each auxiliary frame member, a correspondingly V-shaped element projecting inwardly from the vertical side of each opening in the main frame, and locking means for securing said auxiliary frames in the said openings in the main frames in a manner that said V-shaped elements are received in the V-grooves provided therefor and said pads are in contact with the top and bottom edges of said openings, said pads, elements and V-grooves serving to locate and accurately support the auxiliary frames in the main frames.

References Cited

UNITED STATES PATENTS

| | | | |
|---|---|---|---|
| 1,779,310 | 10/1930 | Fischer | 101—152 X |
| 2,012,245 | 8/1935 | Meisel | 101—178 |
| 2,216,562 | 10/1940 | Barber | 101—220 |
| 2,690,121 | 9/1954 | Auerbacher et al. | 101—219 X |
| 2,988,989 | 6/1961 | Crawford | 101—248 XR |
| 3,034,429 | 5/1962 | Brodie et al. | 101—218 |
| 3,041,966 | 7/1962 | Polglase | 101—177 X |
| 3,108,536 | 10/1963 | Harrison | 101—177 X |

ROBERT E. PULFREY, *Primary Examiner.*

W. F. McCARTHY, H. P. EWELL, *Assistant Examiners.*